(12) United States Patent
Cerami et al.

(10) Patent No.: US 7,219,124 B2
(45) Date of Patent: May 15, 2007

(54) PROVISIONING SYSTEM AND METHOD FOR AUTO-DISCOVERING CUSTOMER PREMISES EQUIPMENT IN ACTIVATING XDSL

(75) Inventors: Richard Cerami, Denver, CO (US); Timothy Figueroa, Denver, CO (US); Roxanna Storaasli, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 1054 days.

(21) Appl. No.: 09/921,285

(22) Filed: Aug. 1, 2001
(Under 37 CFR 1.47)

(65) Prior Publication Data

US 2002/0071440 A1    Jun. 13, 2002

Related U.S. Application Data

(60) Provisional application No. 60/222,791, filed on Aug. 1, 2000.

(51) Int. Cl.
*G06F 15/16* (2006.01)

(52) U.S. Cl. .............. 709/203; 709/217; 709/219; 709/220; 709/222; 709/223; 709/224; 709/225; 709/226; 370/351; 370/401; 370/404; 370/431

(58) Field of Classification Search ............... 370/351, 370/404, 401, 304, 431; 709/249, 250, 238, 709/203, 217, 219, 220, 222–226
See application file for complete search history.

(56) References Cited

U.S. PATENT DOCUMENTS

| | | | |
|---|---|---|---|
| 5,097,469 A | 3/1992 | Douglas | |
| 5,261,044 A | 11/1993 | Dev et al. | |
| 5,295,244 A | 3/1994 | Dev et al. | |
| 5,388,229 A * | 2/1995 | Hyouga et al. | 710/316 |
| 5,504,863 A | 4/1996 | Yoshida | |
| 5,504,921 A | 4/1996 | Dev et al. | |
| 5,650,994 A | 7/1997 | Daley | |
| 5,655,081 A | 8/1997 | Bonnell et al. | |
| 5,666,481 A | 9/1997 | Lewis | |
| 5,680,325 A | 10/1997 | Rohner | |
| 5,692,030 A | 11/1997 | Teglovic et al. | |
| 5,737,319 A | 4/1998 | Croslin et al. | |
| 5,751,933 A | 5/1998 | Dev et al. | |
| 5,768,614 A | 6/1998 | Takagi et al. | |
| 5,799,154 A | 8/1998 | Kuriyan | |
| 5,802,271 A * | 9/1998 | Hashimoto et al. | 714/44 |
| 5,812,529 A | 9/1998 | Czarnik et al. | |
| 5,850,388 A | 12/1998 | Anderson et al. | |
| 5,870,558 A | 2/1999 | Branton et al. | |
| 5,872,911 A | 2/1999 | Berg | |

(Continued)

FOREIGN PATENT DOCUMENTS

EP    1009154 A2    6/2000

*Primary Examiner*—Saleh Najjar
*Assistant Examiner*—Shawki Ismail
(74) *Attorney, Agent, or Firm*—Townsend and Townsend and Crew LLP

(57) ABSTRACT

The present invention provides for provisioning broadband services using a VDSL-based communication network. The present invention includes a system architecture and method for automatically activating VDSL service by self-discovering customer premises equipment, such as a residential gateway, by determining the loop associated with a user and the subscribed content to be delivered to the user.

17 Claims, 5 Drawing Sheets

U.S. PATENT DOCUMENTS

| | | | |
|---|---|---|---|
| 5,881,048 A | 3/1999 | Croslin | |
| 5,892,812 A | 4/1999 | Pester, III | |
| 5,892,937 A | 4/1999 | Caccavale | |
| 5,920,846 A | 7/1999 | Storch et al. | |
| 5,946,373 A | 8/1999 | Harris | |
| 5,953,389 A | 9/1999 | Pruett et al. | |
| 5,958,009 A | 9/1999 | Friedrich et al. | |
| 5,974,237 A | 10/1999 | Shurmer et al. | |
| 5,978,358 A | 11/1999 | Wang et al. | |
| 5,987,514 A | 11/1999 | Rangarajan | |
| 5,991,264 A | 11/1999 | Croslin | |
| 5,995,485 A | 11/1999 | Croslin | |
| 5,999,179 A | 12/1999 | Kekic et al. | |
| 5,999,540 A | 12/1999 | McGhee | |
| 6,002,996 A | 12/1999 | Burks et al. | |
| 6,006,016 A | 12/1999 | Faigon et al. | |
| 6,018,300 A | 1/2000 | Dowden et al. | |
| 6,023,456 A | 2/2000 | Chapman et al. | |
| 6,038,212 A | 3/2000 | Galand et al. | |
| 6,058,103 A | 5/2000 | Henderson et al. | |
| 6,081,517 A * | 6/2000 | Liu et al. | 370/352 |
| 6,085,243 A | 7/2000 | Fletcher et al. | |
| 6,147,975 A | 11/2000 | Bowman-Amuah | |
| 6,148,335 A | 11/2000 | Haggard et al. | |
| 6,169,724 B1 | 1/2001 | Begum et al. | |
| 6,195,697 B1 | 2/2001 | Bowman-Amuah | |
| 6,199,180 B1 | 3/2001 | Ote et al. | |
| 6,205,563 B1 | 3/2001 | Lewis | |
| 6,209,033 B1 | 3/2001 | Datta et al. | |
| 6,233,449 B1 | 5/2001 | Glitho et al. | |
| 6,249,883 B1 | 6/2001 | Cassidy et al. | |
| 6,269,330 B1 | 7/2001 | Cidon et al. | |
| 6,285,748 B1 | 9/2001 | Lewis | |
| 6,327,669 B1 | 12/2001 | Croslin | |
| 6,349,333 B1 | 2/2002 | Panikatt et al. | |
| 6,374,288 B1 * | 4/2002 | Bhagavath et al. | 709/203 |
| 6,388,990 B1 | 5/2002 | Wetzel | |
| 6,426,948 B1 | 7/2002 | Bowman-Amuah | |
| 6,430,150 B1 | 8/2002 | Azuma et al. | |
| 6,446,123 B1 | 9/2002 | Ballantine et al. | |
| 6,449,259 B1 * | 9/2002 | Allain et al. | 370/253 |
| 6,463,079 B2 | 10/2002 | Sundaresan et al. | |
| 6,480,901 B1 | 11/2002 | Weber et al. | |
| 6,484,200 B1 | 11/2002 | Angal et al. | |
| 6,499,017 B1 * | 12/2002 | Feibelman et al. | 705/8 |
| 6,515,976 B1 * | 2/2003 | Dent et al. | 370/336 |
| 6,542,266 B1 * | 4/2003 | Phillips et al. | 370/395.1 |
| 6,556,659 B1 | 4/2003 | Bowman-Amuah | |
| 6,571,285 B1 | 5/2003 | Groath et al. | |
| 6,578,077 B1 | 6/2003 | Rakoshitz et al. | |
| 6,580,727 B1 * | 6/2003 | Yim et al. | 370/463 |
| 6,597,660 B1 | 7/2003 | Rueda et al. | |
| 6,604,137 B2 | 8/2003 | Cowan et al. | |
| 6,611,867 B1 | 8/2003 | Bowman-Amuah | |
| 6,631,407 B1 | 10/2003 | Mukaiyama et al. | |
| 6,647,414 B1 | 11/2003 | Eriksson et al. | |
| 6,711,137 B1 | 3/2004 | Klassen et al. | |
| 6,727,927 B1 | 4/2004 | Dempski et al. | |
| 6,760,847 B1 * | 7/2004 | Liu et al. | 713/300 |
| 6,765,864 B1 | 7/2004 | Natarajan et al. | |
| 6,765,873 B1 | 7/2004 | Fichou et al. | |
| 6,775,303 B1 | 8/2004 | Rustad et al. | |
| 6,785,296 B1 | 8/2004 | Bell | |
| 6,788,765 B1 | 9/2004 | Beamon | |
| 6,804,714 B1 | 10/2004 | Tummalapalli | |
| 6,900,807 B1 | 5/2005 | Liongosari et al. | |
| 6,901,530 B2 | 5/2005 | Cerami et al. | |
| 2002/0073062 A1 | 6/2002 | Cerami et al. | |
| 2002/0073355 A1 | 6/2002 | Cerami et al. | |
| 2002/0078017 A1 | 6/2002 | Cerami et al. | |
| 2003/0149919 A1 | 8/2003 | Greenwald et al. | |
| 2005/0183129 A1 | 8/2005 | Cerami et al. | |

* cited by examiner

PROVISIONING SYSTEM AND METHOD FOR AUTO-DISCOVERING CUSTOMER PREMISES EQUIPMENT IN ACTIVATING XDSL

CROSS-REFERENCES TO RELATED APPLICATIONS

This application claims priority from U.S. Provisional Patent Application No. 60/222,791, filed Aug. 1, 2000, entitled "Management of Virtual and Physical Network Inventories," which is hereby incorporated by reference, as is set forth in full in this document, for all purposes.

This application is related to the co-pending applications No. 09/921,282, entitled "MANAGEMENT OF VIRTUAL AND PHYSICAL INVENTORIES"; No. 09/921,294, entitled "PERFORMANCE MODELING IN A VDSL NETWORK"; No. 09/921,276 entitled "FAULT MANAGEMENT IN A VDSL NETWORK"; No. 09/921,277, entitled "FAULT MANAGEMENT IN A VDSL NETWORK"; No. 09/921,283 entitled "PROACTIVE REPAIR PROCESS IN THE xDSL NETWORK (WITH A VDSL FOCUS)"; No. 09/921,275, entitled "PROACTIVE SERVICE REQUEST MANAGEMENT AND MEASUREMENT", and No. 09/921,274 entitled "LINKING ORDER ENTRY PROCESS TO REALTIME NETWORK INVENTORIES AND CAPACITIES", all filed Aug. 1, 2001, the disclosures of which are incorporated herein by reference.

BACKGROUND OF THE INVENTION

The present invention generally relates to provisioning broadband and narrowband services using a VDSL-based communication network, and more particularly to a system architecture and method for automatically activating VDSL service by self-discovering customer premises equipment.

VDSL (Very high speed Digital Subscriber Line) is a packet-based transmission architecture used to provide extremely high bandwidth distribution of digital video and data signals to customer buildings. A VDSL-based architecture can advantageously provide a single platform for supporting bandwidth-intensive applications, such as Internet access, remote LAN access, video conferencing, video-on-demand, and the like.

VDSL services are typically implemented in an asymmetric form having a downstream transmission capability of about 52 Mbps over twisted pair copper wire arranged in local loops of 300 m, 26 Mbps at 1,000 m, and 13 Mbps at 1,500 m. Upstream data rates in asymmetric implementations tend to range from about 1.6 Mbps to about 2.3 Mbps. A typical distribution network includes a central office equipped with a host digital terminal (HDT) and arranged to operate as hub between multiple video information providers (VIPs) and digital service providers (DSPs) and customer residential dwellings. In a fiber-to-the-neighborhood (FTTN) type distribution network, optic fiber (e.g. OC-3c and OC-12c) lines are used to connect the central office to a universal system access multiplexer (USAM), which is then connected to a network interface device (NID) located on the customer property via twisted pair copper wire. A dedicated VDSL loop extends between the NID and an individual customer residence using an existing POTS or telephone system twisted pair wire, and a customer interface device (i.e., customer premises equipment), such as a residential gateway or set top box, provides a connection point for a customer television or personal computer. A fiber-to-the-curb (FTTC) type distribution network is similar except that a broadband network unit (BNU) is used in place of the USAM, and coaxial cable is used to connect the BNU, NID, and set top box.

In provisioning video and data in any distribution network, a primary focus is connecting a customer interface device to a loop for activating transport for both services and delivery of subscribed content. To date, known techniques of provisioning VDSL broadband networks utilize mechanized techniques to activate both the facilities and content delivery by manually activating a residential gateway, for example. Accordingly, there are numerous disadvantages to such conventional provisioning of VDSL services as outlined below.

One such disadvantage is the amount of labor intensive effort required to activate customer premises equipment (CPE). First, a loop associated with the CPE to be activated typically requires manual assignments of ports, cards, ONUs (Optical Network Units) and MAC ID (Media Access Control Identifier) to that particular loop. Second, a MAC ID or address associated with the CPE must be manually assigned and provided to the VDSL provider's system and database. Currently, technicians are dispatched to a customer's premise to perform installation of video and data services. The technician then contacts a load specialist at the facility to enter a broadband circuit ID and MAC ID for residential gateways in a content control system. Thereafter, the services are manually activated and relevant data is entered by hand into a database for future servicing and maintenance is performed. Lastly, the technician notifies the load specialist that installation is complete and the order is closed. Such manual efforts result in high installation costs that may make VDSL cost prohibitive to some consumers.

Another disadvantage of conventional approaches to provisioning VDSL services is due to the use of multiple systems and databases that are not configured to exchange information. Multiple databases thus require manual data entry to synchronize the multiple systems used to provision all the subscriber's services. Typically, video services are activated manually only after the transport services, such as a loop assignment, have been provisioned manually. This arrangement leads to increased leadtime for consumers to receive video services as well as increased labor costs.

Yet another disadvantage to conventional approaches to provisioning VDSL is the inherent error rate introduced into the order and delivery process. For example, manual provisioning and activation typically include incorrectly entered loop components, such as a wrong port, card, ONU and/ or MAC ID, or the like. Such errors lead to customer dissatisfaction and increased repair costs.

Therefore, a need exists for a system architecture and method that overcomes the above-noted problems and automatically activates VDSL service for new customers, wherein such activation is by self-discovering customer premises equipment.

SUMMARY OF THE INVENTION

The present invention provides for provisioning broadband and narrowband services using a VDSL-based communication network, and more particularly to a system architecture and method for automatically activating VDSL service by self-discovering customer premises equipment, such as a residential gateway.

In accordance with the present invention, activation of a residential gateway, for example, is performed automatically without manually providing a MAC ID to the VDSL services provider. Additionally, automatic data entry, rather than manual data entry, synchronizes and activates a customer's VDSL service with content that the user has subscribed. Furthermore, according to the present invention, the errors due to manual provisioning and activation are eliminated.

According to one embodiment, a method for activating service in a VDSL-based broadband communication network is disclosed. The network includes a number of loops where each loop includes a source end and a destination end. Each of the source ends are coupled to a computer system used to provision VDSL service. The computer system is also coupled to a database having a data structure. The method comprises associating a user to content subscribed by the user, assigning at least one of the plurality of loops to the user, coupling a user device to the destination end of the at least one loop, determining a path associated with the coupled user device, and matching the path with the content subscribed by the user.

DETAILED DESCRIPTION OF THE INVENTION

Figure 1:
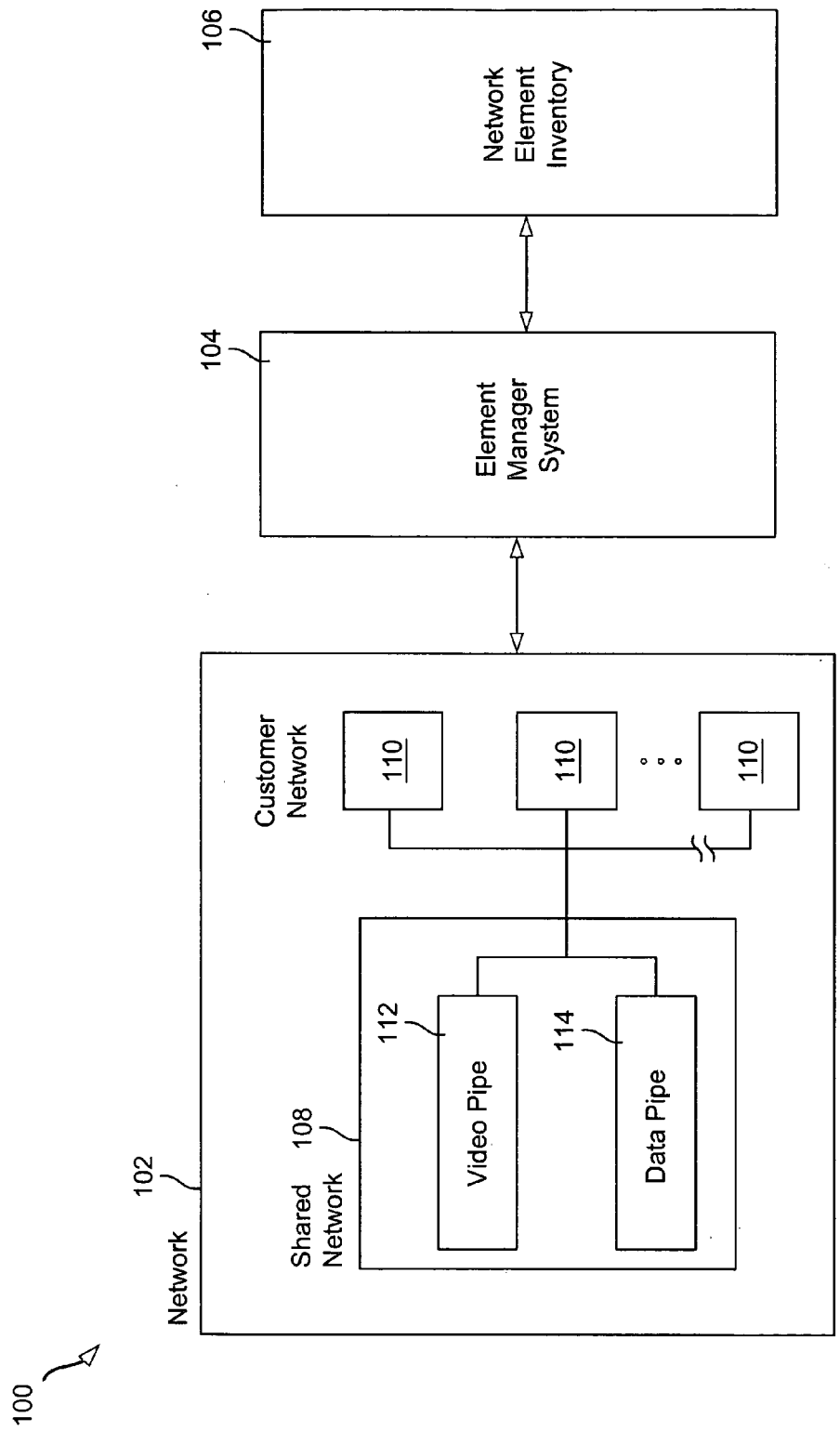
FIG. 1 is a simplified block diagram of an system according to an embodiment of the present invention.

FIG. 1 illustrates a system 100 including components that may be included in a network element inventory. As shown, a network 102, element management system 104, and network element inventory 106 are included.

Network 102 may be any network capable of delivering telephony, video, and/or data to customers. In one embodiment, the network is a xDSL network capable of delivering telephony, video, and/or data to customers at high speeds. It is noted for purposes of understanding the present invention, the term xDSL is used as a broad label for identifying a number of different types of digital subscriber line (DSL) signal formats, such as rate adaptive DSL (RADSL), ADSL, high-bit-rate DSL (HDSL), and very-high-data-rate DSL (VDSL). The present invention as described below can be suitably adapted to provide compatibility for one or more of these formats within the same distribution system.

As shown, network 102 includes a shared network 108 and a plurality of customer networks 110. Customer network 110 may be any network connecting the customer to shared network 108. A customer network in the plurality of customer networks 110 may be an individual network for one customer or a network for a group of customers.

Shared network 108 may be any network that is shared among plurality of customer networks 110. Shared network 108 handles the flow of telephony, video, and/or data from a service provider and routes signals to plurality of customer networks 110, which routes the signals to individual customers. Additionally, shared network 108 includes a video pipe 112 and data pipe 114. Video pipe 108 delivers video to plurality of customer networks 110 and data pipe 114 delivers data (e.g., high-speed data) to plurality of customer networks 110.

Element Management System (EMS) 104 may be any computing system including a computer and a database capable of receiving data from shared network 108 and plurality of customer networks 110. In one embodiment, EMS 104 is the only system that accesses data from shared network 108 and plurality of customer networks 110. The data received from the network may include, for example, performance data, fault data, and an inventory of network elements. Additionally, EMS 104 may include customer data, which includes data relating customers to designated physical and logical paths in shared network 108 and plurality of customer networks 110. In one embodiment, EMS 104 is substantially similar in functionality and structure as the element manager described below.

Network element inventory 106 may be any database capable of storing data relating to network 102. In one embodiment, the network element inventory 106 may receive data from shared network 108 and plurality of customer networks 110 directly thereby removing the need for EMS 104. Network element inventory 106 includes network discovered physical inventory, network discovered logical inventory, and planned network inventory in one embodiment.

Figure 2A:
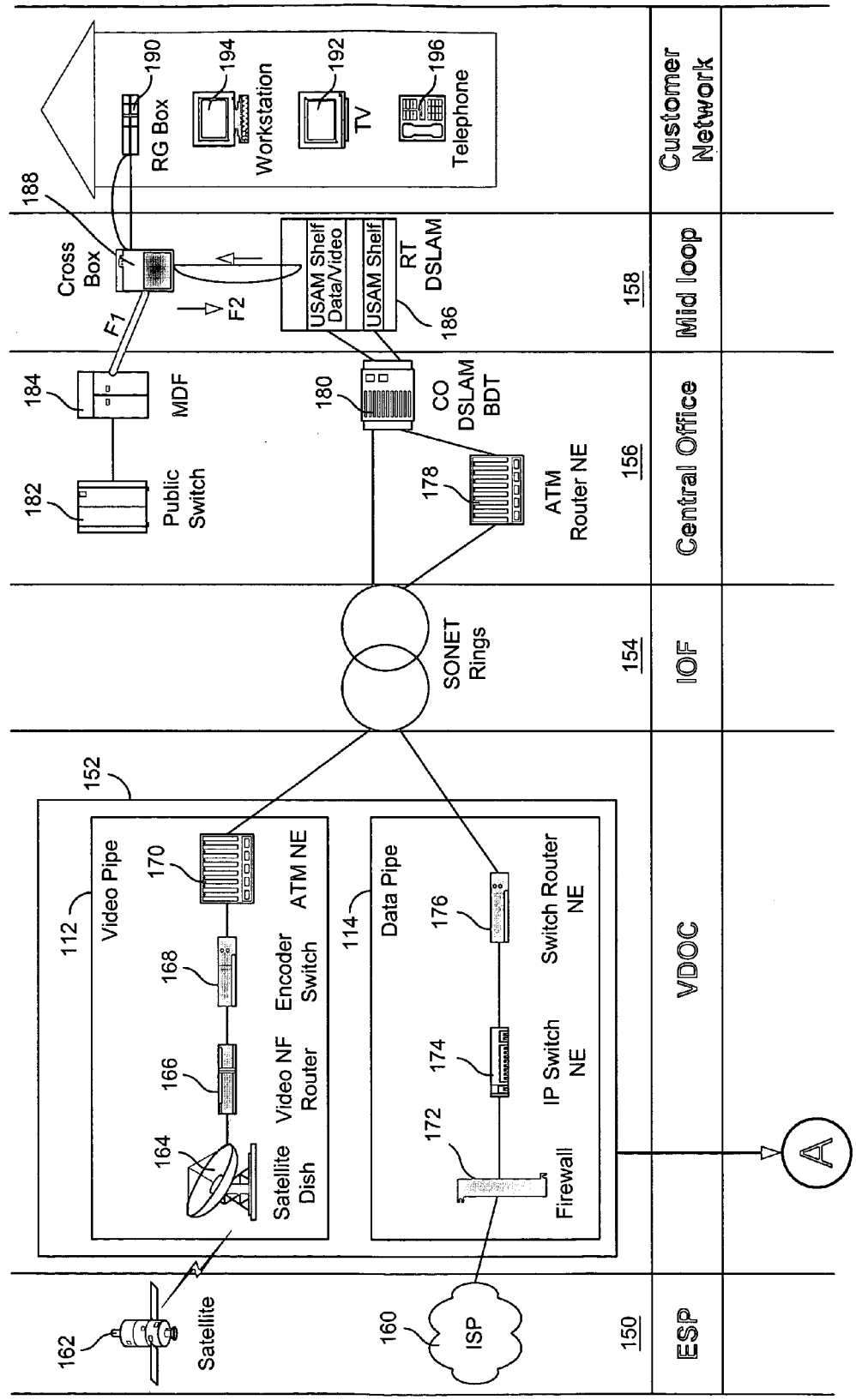
FIG. 2 is a more detailed block diagram of the provisioning system.
Figure 2B:
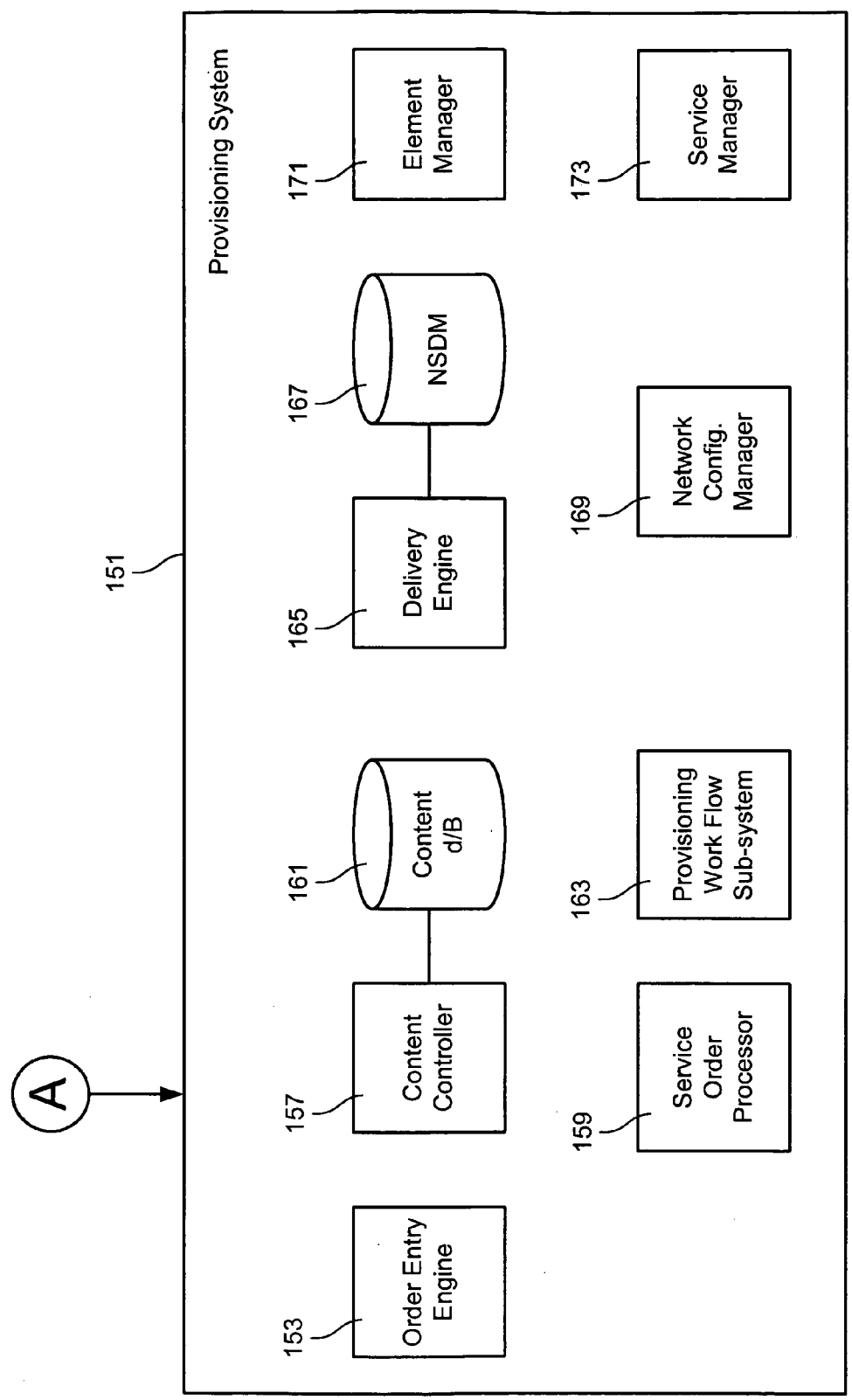

FIG. 2 shows a detailed shared network 108 of FIG. 1, according to one embodiment. As shown, the shared network includes an external service provider section (ESP), a video/data operation center (VDOC), an interoffice facility (IOF), central office, and midloop. In one embodiment, the ESP section includes an Internet Service Provider (ISP) 160 and satellite 162. The ISP provides access to the Internet and other data services. The satellite provides access to video and other video services. While the data and video providers are shown as ISP and satellite providers, it will be understood by a person skilled in the art that other ways of providing video and data services are possible.

VDOC 152 includes a video pipe 112 and data pipe 114 of FIG. 1. Video pipe 112 delivers video signals to and from ESP 150 to IOF 154 through optic fiber, such as 2xOC-12c. Data pipe 114 delivers data to and from the ESP 150 to IOF 154 through optic fiber, such as 2xOC-3c. In one embodiment, video pipe 112 delivers video using video asynchronous transfer mode (ATM) based protocol. In one embodiment, data pipe 114 delivers data using Internet Protocol (IP)/ATM based protocol. A suitable ATM protocol to practice an embodiment of the present invention is described in commonly assigned U.S. Pat. No. 6,198,744 ("Asynchronous Transfer Mode (ATM) Based Very-High-Bit-Rate Digital (VDSL) Subscriber Line Communication System And Method"), which is hereby incorporated by reference for all purposes.

Exemplary video pipe 112 includes video received from a satellite dish 164, video router 166, encoder switch 168, and ATM network element (NE) 170. Exemplary data pipe 114 includes a firewall 172, IP switch network element 174, and switch router network element 176. It should be understood that a person of skill in the art will appreciate other ways of implementing video and data pipes.

IOF 154 includes synchronous optical network rings (SONET). One having ordinary skill in the art, however, should appreciate that the SONET rings may be any communication network (e.g., optical or the like) capable of delivering video and data to and from the VDOC 152 and central office 156.

Central Office (CO) 156 includes an ATM router NE 178 and CO Digital Subscriber Loop Access Module (DSLAM) 180. In one embodiment, CO DSLAM 180 may be a broadband digital terminal (BDT). ATM router NE 178 and CO DSLAM BDT 180 are connected to the IOF and midloop sections through optic fiber, such as OC-3c and 2xOC-12c. Additionally, CO 156 office includes a public switch 182 and Main Distribution Frame (MDF) 184, which is where an outside customer network is connected to the shared network. In one embodiment, public switch 182 and MDF 184 provide telephony service to a customer. Additionally, MDF 184 is connected to midloop section 158.

Midloop 158 includes a RT DSLAM 186 (Remote DSLAM) and may include a crossbox 188. The crossbox provides a connection from the shared network to the customer networks. The RT DSLAM includes Universal Service Access Multiplexers (USAM), Multiple Dwelling Units (MDUs) and/or Broadband Network Units (BNUs). Additionally, an ONU may be assigned to any of RT DSLAMs 186. An ONU operates as, or substantially similar to, a router for RT DSLAM 186.

The USAM is a network element that is located in neighborhood locations to convert optical video and data signals sent from CO DSLAM 180 and convert them into electrical signals. The electrical signals may be combined with a telephone signal and are sent to customer's locations. The USAM is a terminal for fiber-to-the-node deployment and feeds service to customer locations via a cross box used to serve that neighborhood.

A BNU is a network element that is located in the immediate area of a customer service location. The BNU is used to convert the optical video and data signal sent from CO DSLAM 180 and convert them to electrical signals. The electrical signals may be combined with a telephone signal and are sent to customer's locations. The BNU is the terminal for the fiber-to-the-curb deployment and feeds service to the customer location directly (e.g., no cross box).

The MDU is the network element that is suitable for location in an office apartment building. This is used to convert the optical video and data signals sent from a CO DSLAM and convert them to electrical signals. The electrical signals may be combined with a telephone signal and are sent to the customer's location within the building. The MDU is a variation of a terminal for fiber-to-the-node deployment and feeds service to the customer location directly and not through the cross box associated with a particular distribution area (DA).

If midloop section 158 includes a cross box, the cross box relays signals from the RT DSLAM 186 and telephony, data, and/or video signals from midloop 158 to the customer.

As shown, a customer network in plurality of customer networks 110 of FIG. 1, includes a residential gateway box (RG) 190. Residential gateway box 190 is connected to the cross box 188 or RT DSLAM if cross box 188 is not present and receives the video, data, and/or telephony signals. The RG box 190 may be connected to a TV 192, workstation 194 or computer, telephone 296, or any other suitable customer premises equipment. Thus, the customer can receive telephony, video, and/or data signals from the network.

Further in FIG. 2, a provisioning system 151 is coupled to VDOC 152 to exchange information to self-discover a CPE according to the present invention. Provisioning system 151 includes the following subsystems or modules: order entry engine 153, content controller 157 coupled to content database 161, service order processor 159, provisioning work flow processor 163, delivery engine 165 coupled to NSDB 167, network configuration manager 169, element manager 171, and service manager 173, where each subsystem or module may be implemented in software, hardware and a combination thereof. In one embodiment, each subsystem or module are configured to exchange data with each other within provisioning system 151 as well as VDOC 152. The functionality of each subsystem or module will be described below in connection with FIGS. 3 and 4.

Figure 3:
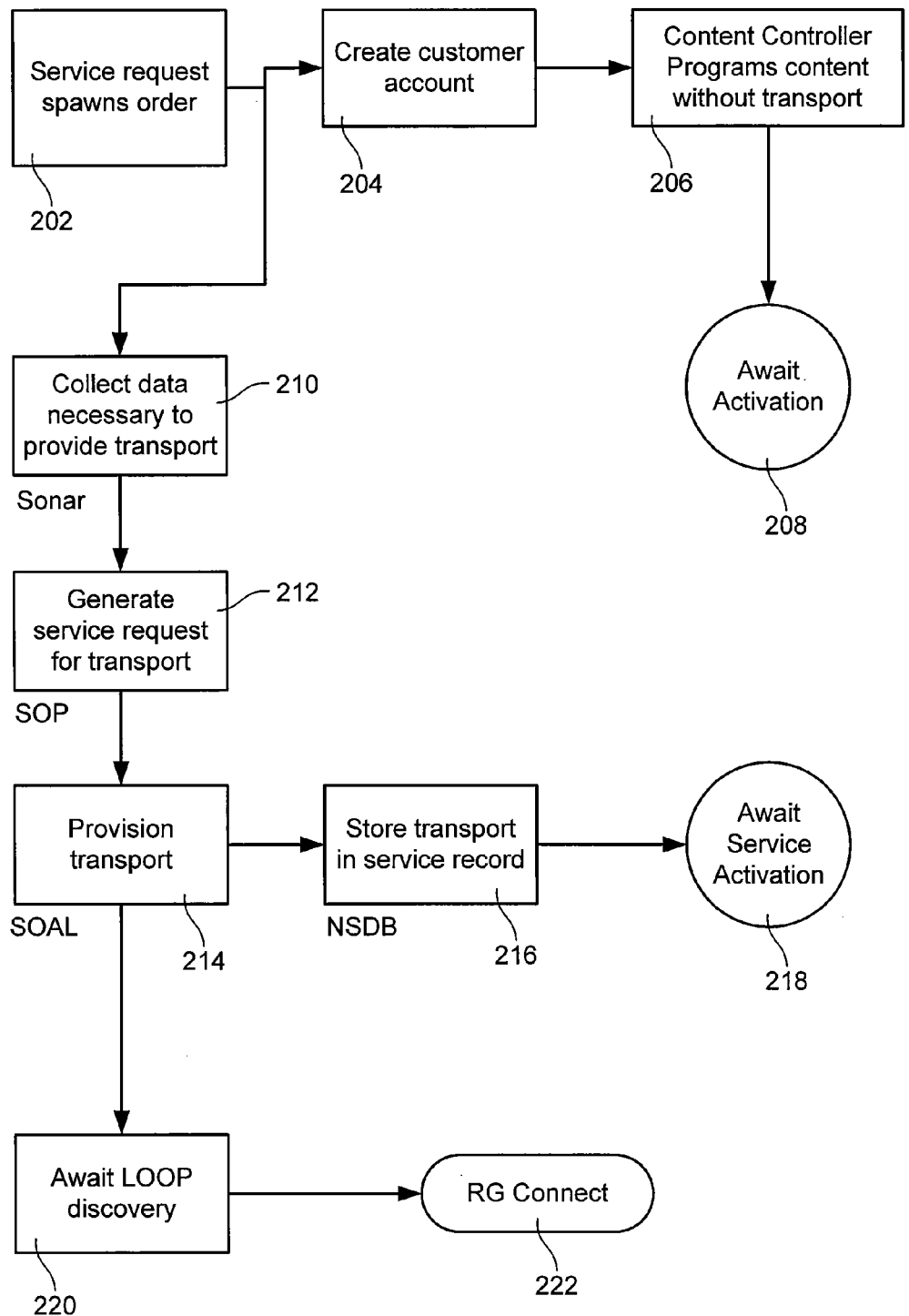
FIG. 3 is a flow diagram showing an exemplary method of provisioning a loop for self-discovery.

FIG. 3 is a flow diagram showing an exemplary method of provisioning a loop for self-discovery, according to one embodiment of the present invention. Although the description below describes the method in relation to VDSL, one having ordinary skill in the art should appreciate that any digital subscriber line (i.e., XDSL) in suitable to practice the present invention. At 202, a service request is created which, in turn, spawns orders that are provided to an order entry engine. According to this embodiment, video service such as content (e.g., subscribed cable channels in a particular programming lineup) is provisioned in a separate process than the provisioning of the transport (e.g., IP, ATM, Ethernet, optical, or any other type of transport). An exemplary entity that provides such transport is Qwest, Inc. An exemplary service request might be created by a human service consultant interacting with a user, or automatically by having a user provide information to an automated service request system, such as populating an HTML web-base form with data necessary to provide a user with services.

At 204, the order entry engine creates an account associated with a user, such as a customer. The order entry engine allows a user to subscribe to one or more different aspects of a service, such as one or more cable television channels. This way, a user need not be required to purchase a block of channels when a fewer number is desired. In one embodiment, the order entry engine is a Windows-based software program functioning on a networked computing device that provides customer service representatives with access to a customer's account for adding, modifying or deleting a customer service.

At 206, a change in a customer's account is programmed into a content controller. An exemplary content controller or control subsystem that might be used to practice the present invention is the Communications Control System (CCS)™ provided by CSG Systems, Inc. CSS enables customer service representatives to enroll new customers, modify services for current customers, schedule installation and repairs and process billing, for example. The content control system also is configured to store the customer's account created by the order entry engine and stores such information in a content control database 161 of FIG. 2. Optionally, data representing the subscriber's content is also stored in database 161.

Returning to FIG. 3, at 208, the content associated with a customer's account is thus selected and programmed by the content controller, regardless of whether associated with cable or dish-based satellite video, telephony, etc. The content controller then awaits an acknowledgement that a service offering has been established (i.e., activation of residential gateway) as will be described below. According to an embodiment of the present invention, content may be provided by multiple content service providers as described in commonly assigned U.S. Pat. No. 6,195,364 ("VSDL Multiple Service Provider Interface"), which is hereby incorporated by reference for all purposes.

At 210, the provisioning of physical network elements (e.g., loop components such as port or card) the transportation means ("transport") is initiated. According to one embodiment of the present invention, the transport is a packet-based protocol, such as ATM, whereby the provisioning of such transport is the provisioning of the virtual path connection (e.g., permanent virtual circuit) associated with ATM protocol. The transport is used to communicate voice, data, audio and/ or video and might be by ATM (Asynchronous Transfer Mode), TCP/IP, or any other like protocol. Transport data characterizes the type of transport provisioned and is used to relate the transport to a user and the user's subscribed services. Such data includes the destination of the purchased service, such as a home, business, neighborhood or the like. Additionally, the data is used to determine whether the service is either DSL-RADSL, ADSL and VDSL, whether such service will be a Fiber to the Node (FTTN) or a Fiber to the Curb (FTTC) configuration, and whether the connection is a permanent or switched virtual circuit (PVC or SVC), for example. Optionally, a credit check may be preformed at 210 as well to determine whether the customer will be able to immediately purchase services provided by the provisioning system.

At 212, a service order is generated to configure and provision a specific transport. Such a service order may be created by a customer service representative or automatically by service order processor 159 of FIG. 2. An exemplary service order processor 159 includes computing devices and/ or computer program code configured to perform automatic service order generation.

At 214, the service order is provisioned. In one embodiment, the service order is received into a provisioning work flow subsystem. The provisioning work flow subsystem determines the physical transport associated with a user and the user's destination, such as a customer's house. An exemplary provisioning work flow subsystem 163 includes computing devices and/ or computer program code configured to execute a pending service order.

At 216 and after the transport has been determined, the determined transport is sent to a database and is stored in a service record associated with the particular user. In one embodiment, a NSDB (Network Services Data Base) is used to store and provide access to the user's account information, especially information related to the transport. Also, specific loop components, such as a port or a card, are assigned to the user submitting the request for xDSL services. For example, the transport information is available to verify proper activation of services and thus awaits an acknowledgment until such a service has been activated at 218.

For example, an exemplary service report may include data such as a telephone number, telephone features (e.g., multiple lines, etc.), high-speed data speed of transmission selected, Internet Services Provider (ISP), channel packages (video), USAM port, card, ONU, MAC ID, VCI/IVPI assignments (ATM virtual path identifiers/virtual channel identifiers for network and/ or subscriber), TP Pool name, and other pertinent information useful to provide and maintain services over a VDSL network.

Provisioning work flow subsystem 163 of FIG. 2 is also configured to communicate with a loop inventory system (not shown) that, in part, manages a number of physical loops and respective loop components (e.g., ports, cards, and the like). Provisioning work flow subsystem 163 also manages an assignment of a loop in the case of a new customer service order. That is, a new customer will be assigned a new loop associated with a dedicated BDT (Broadband Digital Terminal), ONU (Optical Network Unit), port and card, all which are associated with a specific broadband circuit ID.

According to an embodiment of the present invention, provisioning work flow subsystem 163 is also configured to await the activation of services for a specific customer at 220. Upon connection to an assigned loop by a customer, the exemplary provisioning work flow subsystem detects a connect CPE and thus a loop is "discovered." At 222 in FIG. 3, the connection of a residential gateway (i.e., RG) to an assigned loop will be detected by the provisioning work flow subsystem according to an embodiment of the present invention. RG is also referred to in the art as customer premises equipment (CPE).

Figure 4:
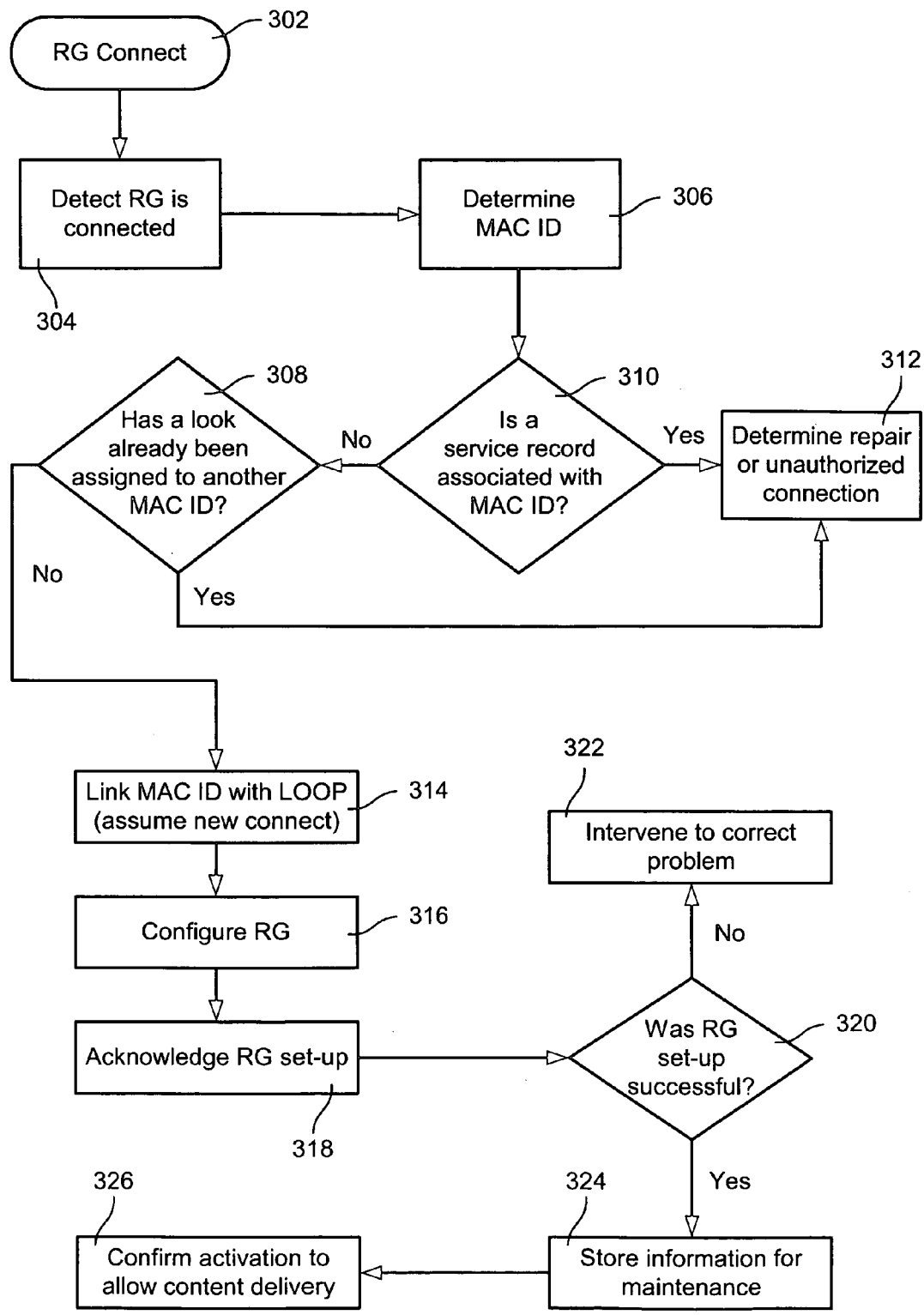
FIG. 4 is a flow diagram showing a continuation of the exemplary method of FIG. 3.

FIG. 4 illustrates a method of automatic loop discovery according to one embodiment of the present invention. As shown in FIG. 4, at 302, a residential gateway or a suitable substitute is coupled to a loop. For example, when a customer or technician associated with the delivery of services connects a residential gateway to a loop at, for example, a point in the loop after an NID Network Interface Device) and internal to the residential house, a loop connection has been established.

At 304, the connected residential gateway is detected. Such detection may be performed by provisioning system 151 of FIG. 2 and the residential gateway may be detected in a variety of ways. For example, upon completing a power-up sequence the residential gateway may communicate with the system by sending a signal acknowledging its connection to the loop. In another example, the provisioning system continuously or periodically tests the loop to detect whether loop the includes a networked device and whether that device is authorized to be connected.

At 306 of FIG. 4, at least one MAC ID (Media Access Control Identifier) associated with the residential gateway is determined. A MAC ID may be determined, for example, by retrieving a stored MAC ID from the memory of a CPE, such as a residential customer premises equipment or gateway. The stored MAC ID may be programmed from a default address to a unique MAC ID by, for example, a technician installing the network device or residential gateway. For example, the unique MAC ID may be assigned (e.g., programmed) and associated with a particular residential gateway from the manufacturer, distributor, or any like entity before the gateway is received by the end customer.

In one embodiment, the auto-discovery of the MAC ID associated with the discovered loop, is performed by an element manager program operating in a computer system configured to receive the detection of a new MAC ID. An exemplary element manager program is View-1™ provided by NextLevel Communications, Inc. View-1 is an application program distributed in a client-server architecture and is used in configuring customer premise equipment, such a residential gateway. When a new CPE device is detected on a loop, the element manager program queries the CPE device to determine, for example, its MAC ID, and its device (e.g., CPE) type, such as a residential gateway or any other like equipment. A new device is discovered, for example, by the CPE initiating communication with the provisioning system, such that when the system acknowledges receipt of the communicated data from the CPE, the CPE is "detected."

The element manager also determines the path or loop that is associated to the discovered MAC ID and device type by, for example, pinging its path back to the element manager. Pinging is a well known technique for determining devices and addresses connected to a network.

This data is then used correlate a auto-discovered MAC ID with a particular user. Once the device type is known to the provisioning system, then the type of transport and the types of available services (e.g., video, telephony, high-speed data, etc.) may be deduced from the type of CPE that has been connected to a loop.

At 310, a service record is sought where the service record is associated with the auto-discovered MAC ID. The provisioning system is configured to search through a database of service records to find whether a match relating a service record to the CPE exists. More specifically, an exemplary delivery engine 165 of FIG. 2 operates to match a newly auto-discovered MAC ID to a specific customer by comparing port and card (and optionally with a ONU), as determined by a networked provisioning system, to the contents of a service record within NSDB 167, which is performed under control of network configuration manager 169. The contents of the service record includes a list or collection of data that associates users to a physical inventory of loop components such as a port and card, where identified loop components and their associations to a specific user are managed by a loop inventory system.

An exemplary match occurs when one or more fields of the service record generated from data provided at 210 of FIG. 2 is equivalent to information received from the residential gateway. For example, once the provisioning system determines the device type, MAC ID and associated path, then the system is able to match a customer to the newly discovered MAC ID by matching a port or card identified in the service record to the associated path with the residential gateway connected to the loop. Once the user is determined, then the content and associated services is activated, for example, within seconds or minutes after the particular CPE is connected and self-discovered. Such activation of content and services is determined by retrieving such information from content database 161 of FIG. 2.

At 312, if a match does exist, then the user is assumed to be a current customer (i.e., not a new customer) and the customer premises equipment may need repair or replacement. Alternatively, with no match or service record available, then the connection to the loop may be unauthorized. Upon detection of an unauthorized connection, appropriate anti-fraud measures may be taken.

At 308, if no match exists, the auto-discovered MAC ID is designated as a new MAC ID. Also, a further inquiry is made to determine whether the loop and its elements (i.e., BDT, ONU, port, card, or the like) have already been assigned to another MAC ID. If a loop and its elements have already been assigned to another MAC ID, then the duplicate assignment is resolved at 312.

At 314, if the loop and its elements have not been assigned (i.e., reserved for the respective MAC ID), then connection of the residential gateway at 302 is presumed to be a new connection for services. Also at 314, the new MAC ID is linked or mapped to the loop elements via the data stored in the service record. For example, the mapping is performed by creating a new data item or field in a relational database.

According to one embodiment, a network configuration manager is configured to determine whether the elements ONU, port, card, etc., have been linked to another pre-existing MAC ID during the activation of services for a new customer. An exemplary network configuration manager 169 is shown residing in provisioning system 151 of FIG. 2.

At 316 of FIG. 4, such a network configuration manager fetches information from the service record, and in combination with the reported MAC ID, configures the residential gateway whereby the actual provisioning of the transport and services is performed.

An exemplary network configuration manager to practice the present is a Network Configuration Management computer program (NCON™) provided by Telcordia Technologies, Inc. The network configuration manager manages end-to-end connections in network environments where multi-carrier (e.g., XDSL), multi-technology, multi-layer and multi-vendor telecommunications networks exist. The network configuration manager manages the lifecycle of a provisioned connection, from planning and activation, through operations and maintenance, to tear down. Upon configuring the customer premise equipment, NCON sends a "set CPE" message to a service manager, such as service manager 173 of FIG. 2. Such CPE configurations include adapting the CPE to operate in accordance to certain types of transport as necessary to provide the subscribed content.

The service manager operates, in part, to manage content associated with the customer. According to one embodiment, the exemplary service manager is realized by executing a service manager program operating in a computer system. An exemplary service manager program is View-2™ provided by NextLevel Communications, Inc. View-2, like View-1, is an application program distributed in a client-server architecture and is used in managing both video and data services provided to customer premise equipment, such as a residential gateway. For example, the network configuration manager sets up default content temporarily, such as a cable channel lineup including basic channels. The actual lineup which the user has subscribed will be provided to the user after a successful set CPE message is received into the CCS.

The service manager according to the present invention is also configured to generate a "change CPE" message to change the initially linked MAC ID if the NCON determines the residential gateway is faulty and is thus replaced with another residential gateway having updated MAC ID.

At 318, "set CPE acknowledged" message is sent from the service manager to the network configuration manager. The acknowledgment message enables the provisioning system to proceed.

At 320, the set CPE acknowledged message is parsed to determine whether the residential gateway set up was either successful or had failed. At 322, if a failed set CPE acknowledgment is received, then the message is sent to an appropriate entity to intervene and resolve whatever problem contributed to a failed set CPE acknowledgment being sent. For example, the failure of a set CPE message is sent to a provisioning analyst work station (PAWS) so that a human technician may intervene to fix the problem.

At 324, if a successful set CPE acknowledgment is received, then the message is forwarded to the NSDB to update the customer's account with relevant data. For example, once the residential gateway has been successfully configured, pro-rata billing of services may then commence. Additionally, relevant data also includes information necessary to maintain and resolve problems in providing services that may occur in a point of time thereafter.

At 326, if a successful set CPE acknowledgment is received, then the message is forwarded to the content control system (e.g., CCS) to enable the delivery of subscribed content as determined in 206 of FIG. 2. For example, a previously default set of cable television channels might include only broadcast television channels. Upon receiving a successful CPE acknowledgment message, the content controller enables subscribed premium cable channels to be transmitted to the customer via the provisioned transport.

While the best mode for carrying out the invention has been described in detail, those familiar with the art to which this invention relates will recognize various alternative designs and embodiments for practicing the invention as defined by the following claims. For example, although the present invention is described herein in the context of VDSL and residential gateways, persons having ordinary skill in the art will appreciate that other network communication protocol and systems may be used to auto-discover other types of customer premises equipment and such alternative embodiments are within the scope of the present invention. Additionally, the residential gateway in accordance with the present invention may be remotely programmed (i.e., over the loop by the provisioning system) to include the new MAC ID. That is, a connected CPE may be programmed so as to have a unique a hardware address or data link layer address associated with the particular network device (e.g., RG). Such an MAC ID may be programmed into the memory of a customer premises equipment by a computing system, such as a provisioning system server under control of software, where the software is configured to program MAC IDs for each residential gateway coupled to a provisioning system. It will therefore be appreciated by those skilled in the art that yet other modifications could be made to the provided invention without deviating from its spirit and scope as so claimed.

What is claimed is:

1. A method for activating service in a VDSL-based broadband communication network, the network comprising a plurality of loops where each loop includes a source terminus and a destination terminus, wherein each of the source termini are coupled to a computer system, wherein the computer system is coupled to a database having a data structure to store data, the method comprising:
   receiving a service request for content from a user;
   assigning at least one of the plurality of loops to the user;
   storing a service record for content requested by a user in the database, the service record including information for at least one of the plurality of loops, the information including loop component information specific to the user;
   detecting a coupling of a user device to the destination terminus of the at least one loop;
   detecting an address associated with the coupled user device, the address not being stored in the service record;
   determining a path associated with the coupled user device; the path including discovered loop component information;
   matching the discovered loop component information with the loop component information specific to the user that is stored in the service record in the database; and
   providing the requested content via the determined path using the address associated with the user device upon matching the discovered loop component information with the loop component information specific to the user.

2. The method of claim 1, further comprising providing subscribed content via the at least one loop to the user device substantially upon matching the path with the subscribed content.

3. The method of claim 1, wherein associating the user comprises storing content information in the database, where the content information is data representing a user's subscribed content.

4. The method of claim 3 wherein the subscribed content is video.

5. The method of claim 1, wherein assigning the at least one loop comprises storing transport information in the database, where the transport information is data representing at least one of the plurality of loops.

6. The method of claim 5, wherein the transport is configured to operate in accordance with asynchronous transfer mode (ATM) based protocol.

7. The method of claim 1, wherein the loop component information specific to the user includes a port identifier associated with a port or a card identifier associated with a card.

8. The method of claim 1, wherein coupling a user device further comprises coupling a customer premises equipment to the destination terminus of the at least one loop.

9. The method of claim 8, wherein the customer premises equipment is a residential gateway.

10. The method of claim 1, wherein determining the path includes determining a virtual path connection associated with the user device.

11. The method of claim 1, wherein the address includes determining a Media Access Control Identifier (MAC ID).

12. The method of claim 1, wherein determining the path includes further determining a user device type associated with the user device.

13. The method of claim 1, wherein matching the determined loop component information comprises:
   associating the determined loop component information with the at least one loop;
   identifying the user assigned to the at least one loop; and
   retrieving content subscribed by the user from the content database to provide to the user via a VDSL loop.

14. A method for activating service in a VDSL-based broadband communication network, the network comprising a plurality of loops where each loop is coupled from a VDSL provider office to a customer location, wherein each of the plurality of loops have a first loop end and a second loop end, wherein the first loop end is coupled to a computer system at the VDSL provider office, wherein the computer system is coupled to a content database and a network services database, the method comprising:
   associating content subscribed by a user to the user by storing content information in the database, where the content information is data representing a user's subscribed content and is associated with the user;
   assigning to the user a port and a card associated with at least one of the plurality of loops and associating the port and card with the content subscribed to by the user;
   detecting a coupling of a residential gateway to the second loop end at the customer location of the at least one loop;
   detecting an address associated with the residential gateway, the address not being stored in a database;
   determining the port and the card associated with the coupled residential gateway;
   matching the determined port and the card with the port and card associated with the content subscribed to by the user; and
   providing subscribed content via the at least one loop to the residential gateway substantially upon matching the determined port and the card with the port and card associated with the content subscribed to by the user.

15. A method for activating service in a video and data broadband communication network, the method comprising
   receiving a service request for content from a user;
   assigning a network transport to the user;
   storing a service record for content requested by a user in the database, the service record including information for the provisioned network transport, the information including assigned network component information specific to the user;
   detecting a coupling of a user device to the network transport;
   detecting an address associated with the coupled user device, the address not being stored in a database;
   determining a path associated with the coupled user device, the path including discovered network component information;

matching the discovered network component information with the assigned network component information specific to the user that is stored in the service record in the database; and providing the requested content via the determined path associated with the user device upon matching the discovered network component information with the network component information specific to the user, wherein the assigning of the network transport is performed before detecting the coupling of the user device and the providing of the requested content is performed after detecting the coupling of the user device.

16. The method of claim 15, further comprising:
using the address to provide the requested content.

17. The method of claim 1, further comprising programming a second address into the memory of the user device.

* * * * *